May 6, 1947.  M. J. STEFFES  2,420,057
INSERTED BLADE CUTTER AND CLAMPING MEANS
Filed May 13, 1943

INVENTOR.
Milton J. Steffes,
BY
Harness, Dickey & Pierce.
ATTORNEYS

Patented May 6, 1947

2,420,057

UNITED STATES PATENT OFFICE 2,420,057

INSERTED BLADE CUTTER AND CLAMPING MEANS

Milton J. Steffes, Dearborn, Mich., assignor to Super Tool Company, Macomb County, Mich., a partnership Application May 13, 1943, Serial No. 486,833

6 Claims. (Cl. 29—105)

This invention relates to blade clamping devices and particularly to a clamping wedge which is moved by the threads of a screw for applying a holding pressure to a blade in a renewable blade tool.

While it is old in the art to provide various means for applying a holding pressure to renewable blades of tools, it is believed that the holding element of the present invention has particular merit because of its simplicity and the material holding pressure produced thereby. Recesses are provided in the periphery of the tool body in which the blades are disposed and clamped by a wedge element having a portion of an aperture in alignment with a portion in the body forming a cylindrical opening.

A screw is disposed in the cylindrical opening having a thread engagement with the portion of the aperture in the wedge element but not with the portion in the body. After the end of the screw engages the bottom of the aperture, when screwed downwardly therein, the threads react on those of the wedge to move the wedge outwardly of the recess. In view of the very small lead of the thread on the screw, very little force will be required for turning the screw to produce a maximum amount of pressure between the wedge element and the blade to retain the blade in firm fixed relation within the recess.

Serrations may be provided on the wall of the blade and the aperture which abut with each other for increasing the amount of area of engagement therebetween. This adjusts the blade and increases the holding force for preventing the blade from moving within the recess. The serrations are disposed parallel to the side faces of the tool if the adjustment of the blade is to be made outwardly of the body and when the blades are to be adjusted laterally of the body, the serrations are preferably disposed from one to the other side of the body. Any number of the apertures and screws may be employed for clamping the length of wedge against the blade. A reamer is illustrated in which the blades are adjusted outwardly by being moved longitudinally along a tapered surface and retained in adjusted position by wedge elements having a plurality of threaded apertures therein. Any friction on the screw will occur with the threads in the wedge as the screw does not move, irrespective of the amount of movement both outwardly and laterally produced to the wedge element.

Accordingly, the main objects of this invention are: to provide a locking element for a blade of a tool which embodies a wedge having a recess therein containing portions of a thread; to provide a wedge with a recess having threads which are mated with a recess in a body to form a cylindrical opening in which a screw is disposed in threaded engagement with the portion of the thread in the wedge element; to provide a wedge with a recess containing a portion of a thread in engagement with a screw in a tool body which moves the wedge outwardly and laterally to clamp a blade in the tool body when rotated; to increase the contact area between a blade and the wall of a tool body by providing mating serrations therein which increase the holding force produced by the wedge and, in general, to provide a renewable blade tool with clamping means, which is simple in construction, positive in operation and economical of manufacture.

Other objects and features of novelty of this invention will be specifically pointed out or will become apparent, when referring, for a better understanding of the invention, to the following description taken in conjunction with the accompanying drawing, wherein.

Figure 1:
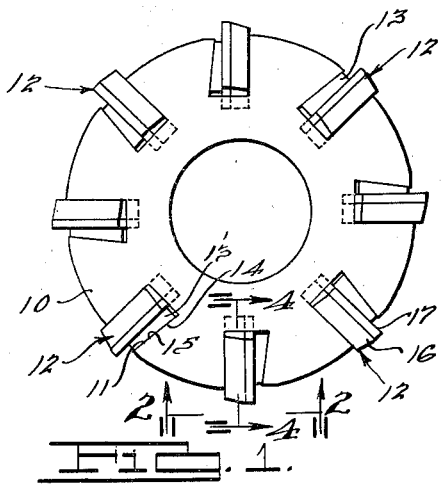
Figure 1 is a view in elevation of a renewable blade type of cutter having holding means for the blades, embodying features of this invention.
Figure 2:
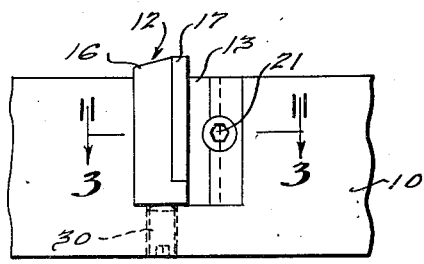
Fig. 2 is an enlarged broken plan view of the structure illustrated in Fig. 1, as viewed from line 2—2 thereof.
Figure 3:
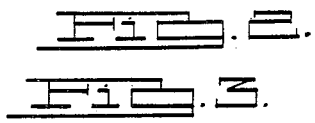
Fig. 3 is a sectional view of the structure illustrated in Fig. 2, taken on the line 3—3 thereof.

Referring to Figures 1 to 4, inclusive, a renewable blade type of cutting tool is illustrated, wherein a tool body 10 is provided with recesses 11 in which blades 12 are retained by wedge elements 13 having a sloping surface 14 which engage a sloping wall 15 of the recesses 11. The blade 12 herein illustrated has a body portion 16 and an inserted cutting portion 17 of hard cutting material. The blades extend outwardly from one side of the body 10 and form a tool for cutting faces disposed at right angles to each other in a workpiece.

The wedge 13 has a portion 18 of a cylindrical aperture, the other portion 19 of which is provided in the tool body 10. The aperture is disposed to intercept the sloping surface 15 of the recess 11 and the sloping surface 14 of the wedge 13. Threads 20 are provided in the recess portion 18 of the wedge and are eliminated from the recess portion 19 in the tool body. A screw 21 is disposed in the recess portions 18 and 19 with the threads thereof engaging the threads 20 in the recess of the wedge. By turning the screw downwardly within the cylindrical aperture formed by the recess portions, the end of the screw bottoms in the recess 11 and the further turning movement applies an outward movement to the wedge 13, which will be moved against the blade 12 by the wedge surfaces 14 and 15 to thereby clamp the blade within the recess.

Figure 4:
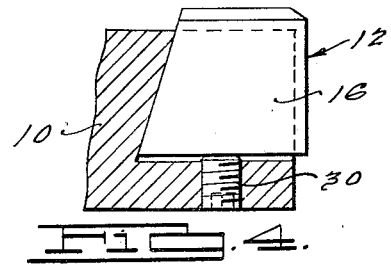
Fig. 4 is an enlarged sectional view of the structure illustrated in Fig. 1, taken on the line 4—4 thereof.

For releasing the blades, the screws 21 are rotated in the opposite direction to screw them partially out of the aperture portions 18 and 19 and the wedges 13 are then tapped downwardly to separate the surface 14 from the surface 15. A material pressure is applied by the wedge 13 to the blade upon the application of a light pressure to turn the screw 21 because of the fast lead of the thread of the screw and that of the recess portion 18 in the wedge. In Fig. 4 backup screws 30 are employed to prevent the inward movement of the blade after adjustment.

Figure 5:
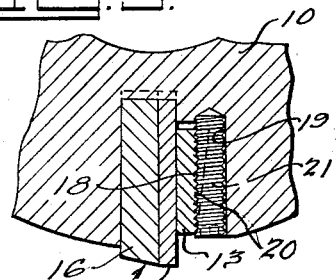
Fig. 5 is a view of structure, similar to that illustrated in Fig. 3, showing a modified form thereof.
Figure 6:
Fig. 6 is a view, partly in section and partly in elevation, of a reaming tool having holding means for the blade, embodying features of this invention.
Figure 6:
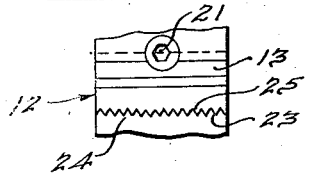

In Fig. 5, serrations 23 are illustrated, provided in the wall 24 of the tool body 10 and the mating wall 25 of the blade 12. The serrations increase the amount of contact area between the respective walls so as to produce a greater resistance against slippage of the blade from its adjusted position. The serrations, as illustrated, are disposed parallel to the sides of the tool body, when the blade is to be adjusted outwardly thereof. Serrations 26 are provided crosswise of the tool body, as illustrated in Fig. 6, when the blades are to be adjusted laterally thereof. The serrations may be disposed at a slight angle when the blade is to be adjusted both laterally and outwardly of the body to permit such an adjustment while providing the additional contact area between the blade and the body wall.

Figure 7:
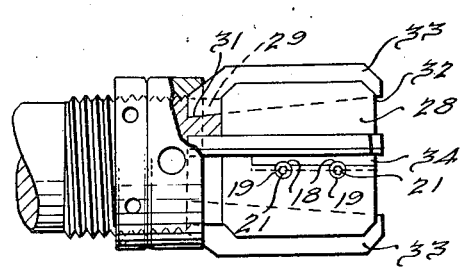
Fig. 7 is a view of structure, similar to that illustrated in Fig. 2, showing another form thereof; and, Fig. 8 is a view of structure, similar to that illustrated in Fig. 2, showing a further form of the invention.

In Fig. 7, a further application of the wedge element 13 is illustrated as applied to a reamer. The reamer body 28 is provided with slots 29 having a sloping bottom web 31 which mates with the sloping edge 32 of a blade 33. The blade is adjusted inwardly and outwardly by being moved longitudinally on the web 31 of the slot 29. A wedge 34 is provided within the slot having a plurality of recess portions 18 mating with recessed portions 19 in the reamer body. Screws 21 are provided in the apertures thus provided for drawing the wedges outwardly when the threads of the screws operate upon the thread sections in the recess portions 18 of the wedge.

When the reamer blades are to be adjusted, the wedges are released by tapping the top surface thereof after the screws have been backed off several turns. The blades 33 may then be shifted longitudinally to produce the desired adjustment after which the screws 21 are tightened to draw the wedges outwardly and clamp the blades in adjusted position.

Figure 8:
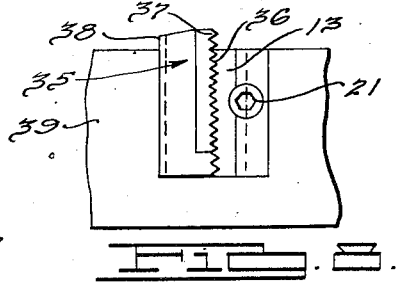

In Fig. 8, a blade 35 is illustrated having serrations 36 on its blade engaging face mating with serrations 37 on the contacted face of the blade. In the figure these serrations are disposed substantially radial of the tool and normal to the serrations 38 in the engaging faces of the tool body 39 and the blade 35. The serrations permit the adjustment of the blade both radially and laterally of the body while providing maximum clamping area for securing the blade fixed in the tool body. This eliminates the backup screw or wedge otherwise employed to prevent the blade from moving after being adjusted and is of particular importance on small or thin tools where it is impossible to employ such backup elements.

It is to be understood that the wedges of the present invention may be employed on other types of tools and devices for securing the adjustable portion thereof in firm fixed position. The wedge may be moved outwardly and laterally by the screw without changing the position of the screw and with a reduced area of engagement between the threads of the screw and those of the wedge. This materially reduces the amount of applied pressure required for securely clamping the blades in adjusted position within the recesses provided in the tool body.

What is claimed is:

1. In a renewable blade type of tool, a body having a plurality of recesses one wall of which is sloping, blades disposed in said recesses, wedges disposed in said recesses having a sloping face in engagement with the sloping walls thereof, segmental cylindrical apertures disposed through said sloping walls of the body and wedges forming a cylindrical aperture when the wedges are assembled in the body, segments of a thread in the aperture portion of said wedges, and screws disposed in said apertures having a thread engaging the thread segments of the wedges for moving the wedges to clamp the blades within the recesses.

2. In a device having an element to be clamped within a recess one wall of which is sloping, a wedge engaging the element and having a sloping face in engagement with the sloping wall of the recess, a cylindrical aperture disposed in said wall and wedge through the sloping engaging walls thereof in such manner as to have the sloping walls intersect the cylindrical aperture from end to end to have segmental portions of the aperture disposed in the sloping faces of the wall and wedge, segments of a thread provided in the portion of said cylindrical aperture in the wedge, and a screw engaging the segments of a thread in said aperture portion in said wedge.

3. In a device for clamping an element, a body having a recess one wall of which is sloping, a wedge engaging the element and having a sloping face in engagement with the sloping wall of the recess, a cylindrical aperture disposed in said body and wedge through the sloping engaging walls thereof in such manner as to have the sloping walls intersect the cylindrical aperture from end to end to have portions of the aperture disposed as segments of a cylinder in the body and wedge, segments of a thread provided in the portion of said cylindrical aperture in the wedge, a screw engaging the segments of a thread in said aperture portion in said wedge, and serrations in said element and adjacent recess wall in nested relation to each other.

4. In a device for clamping an element, a body having a recess one wall of which is sloping, a wedge engaging the element and having a sloping face in engagement with the sloping wall of the recess, a cylindrical aperture disposed in said body and wedge through the sloping engaging walls thereof in such manner as to have the sloping walls intersect the cylindrical aperture from end to end to have portions of the aperture disposed as segments of a cylinder in the body and wedge, segments of a thread provided in the portion of said cylindrical aperture in the wedge, a screw engaging the segments of a thread in said aperture portion in said wedge, and nested serrations in the abutting faces of the element and wedge.

5. In a device for clamping an element, a body having a recess one wall of which is sloping, a wedge engaging the element and having a sloping face in engagement with the sloping wall of the recess, a cylindrical aperture disposed in said body and wedge through the sloping engaging walls thereof in such manner as to have the sloping walls intersect the cylindrical aperture from end to end to have portions of the aperture disposed as segments of a cylinder in the body and wedge, segments of a thread provided in the portion of said cylindrical aperture in the wedge, a screw engaging the segments of a thread in said aperture portion in said wedge, nested serrations in the abutting faces of the element and wedge, and additional serrations normal to said nested serrations between the abutting surfaces of said element and wall of the recess.

6. In a device for clamping an element, a body having a recess one wall of which is sloping, a wedge engaging the element having a sloping face in engagement with the sloping wall of the recess, a cylindrical aperture disposed in said body and wedge through the sloping engaging walls thereof in such manner as to have the sloping walls intersect the cylindrical aperture from end to end to have portions of the aperture disposed as segments of a cylinder in the body and wedge, segments of a thread provided in the portion of said cylindrical aperture in the wedge, and a screw disposed in said aperture having threads engaging the thread segments in the aperture portion of the wedge.

MILTON J. STEFFES.

REFERENCES CITED

The following references are of record in the file of this patent:

UNITED STATES PATENTS

| Number | Name | Date |
|---|---|---|
| 1,348,279 | Heywood | Aug. 3, 1920 |
| 1,397,119 | Wiard | Nov. 15, 1921 |
| 1,411,799 | Miller | Apr. 4, 1922 |
| 1,538,929 | DeVlieg | May 26, 1925 |
| 1,681,675 | Miller | Aug. 21, 1928 |
| 621,288 | Robertshaw | Mar. 14, 1898 |
| 1,951,100 | Miller et al. | Mar. 13, 1934 |
| 1,687,891 | Ray | Oct. 16, 1928 |